United States Patent [19]
Yoshioka et al.

[11] Patent Number: 5,585,798
[45] Date of Patent: Dec. 17, 1996

[54] OBSTACLE DETECTION SYSTEM FOR AUTOMOTIVE VEHICLE

[75] Inventors: Tohru Yoshioka; Hiroki Uemura; Tadayuki Niibe; Ayumu Doi; Kenichi Okuda; Yasunori Yamamoto; Tomohiko Adachi; Naotsugu Masuda, all of Hiroshima-ken, Japan

[73] Assignee: Mazda Motor Corporation, Hiroshima, Japan

[21] Appl. No.: 271,468

[22] Filed: Jul. 7, 1994

[30] Foreign Application Priority Data

Jul. 7, 1993 [JP] Japan .................................. 5-167226

[51] Int. Cl.⁶ .............................................. G01S 13/93
[52] U.S. Cl. ............................................ 342/70; 342/107
[58] Field of Search ............................ 342/70–72, 107, 342/109, 113, 114, 86

[56] References Cited

U.S. PATENT DOCUMENTS

| | | | |
|---|---|---|---|
| 4,158,841 | 6/1979 | Wüchner et al. | 342/71 |
| 4,348,675 | 9/1982 | Senzaki et al. | 342/71 |
| 4,720,711 | 1/1988 | Quesinberry et al. | 342/96 |
| 4,757,450 | 7/1988 | Etoh | 364/426.04 |
| 4,916,450 | 4/1990 | Davis | 342/71 |
| 5,285,207 | 2/1994 | Asbury et al. | 342/129 |
| 5,302,956 | 4/1994 | Asbury et al. | 342/70 |
| 5,314,037 | 5/1994 | Shaw et al. | 180/169 |
| 5,343,206 | 8/1994 | Ansaldi et al. | 342/70 |

FOREIGN PATENT DOCUMENTS 61-6349   2/1986   Japan .

*Primary Examiner*—John B. Sotomayor
*Assistant Examiner*—Christopher K. Montgomery
*Attorney, Agent, or Firm*—Keck, Mahin & Cate

[57] ABSTRACT

An obstacle detection system for an automotive vehicle detects obstacles ahead of the vehicle and finds the dynamic relativity between the vehicle and each of the obstacles. Based on the dynamic relativity, information relating to a danger level between the vehicle and each obstacle is operated on so as to make a danger judgement. A frequency, at which the operations on the information relating to danger level are made, is increasingly or decreasingly varied according to the danger levels of the obstacles.

18 Claims, 5 Drawing Sheets

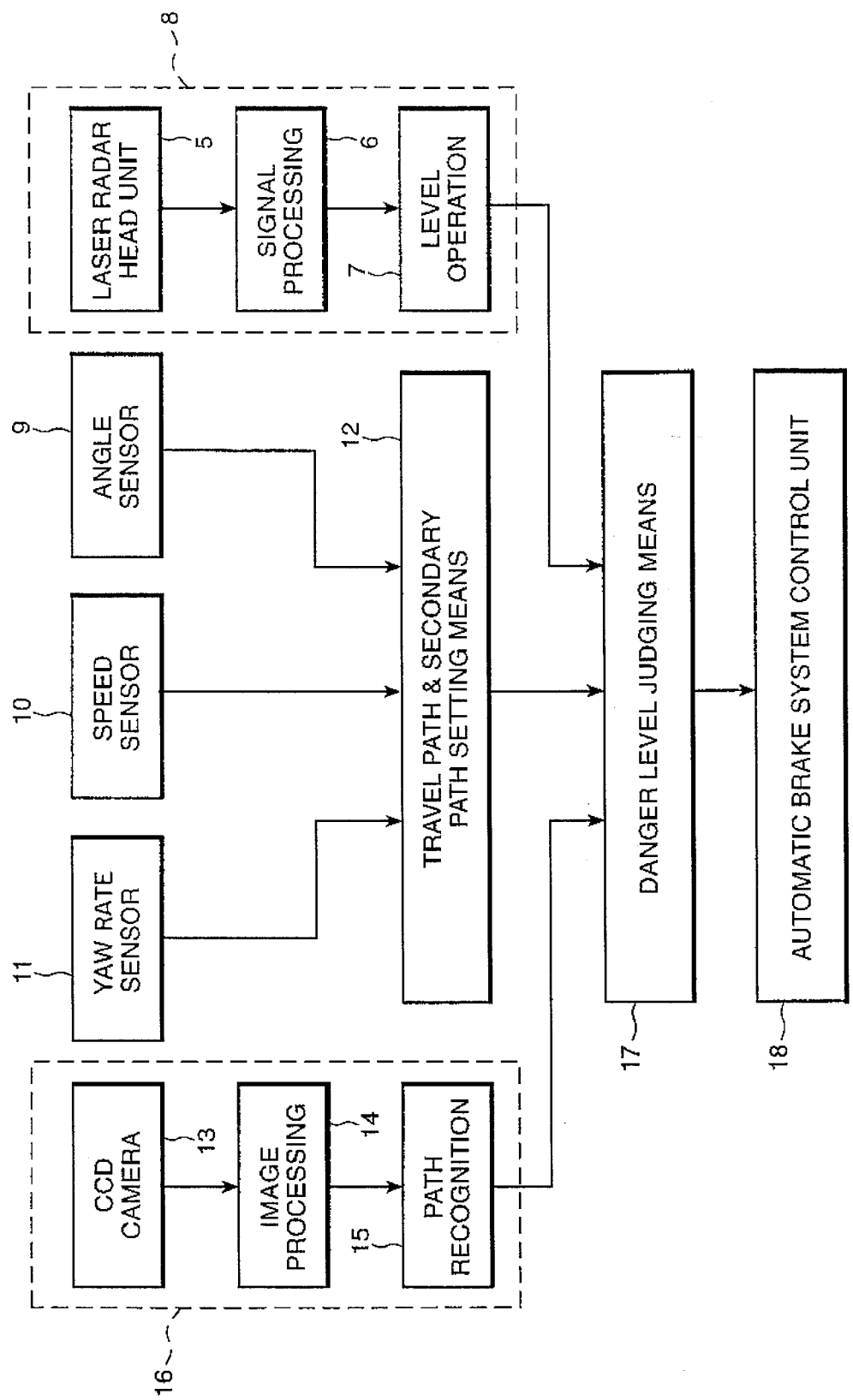

OBSTACLE DETECTION SYSTEM FOR AUTOMOTIVE VEHICLE

BACKGROUND OF THE INVENTION

1. Field of the Invention

The present invention relates to a system for detecting obstacles in an intended path ahead of a vehicle and, more particularly, to an obstacle detection system for checking for obstacles in the intended path ahead of the vehicle.

2. Description of Related Art

Obstacle detection devices or systems for automotive vehicles typically include sensors such as scanning type laser radars. Such a laser radar obstacle detection system irradiates laser light ahead of a vehicle and receives reflected laser light in order to detect and check for obstacles in the path of travel ahead. With the obstacle detection system, since scanning can be made over a wide and long range of view so as to detect many objects as obstacles, a judgment of danger can be made for each of the obstacles detected and drive control is appropriately performed. Such an obstacle detection device is known from, for instance, Japanese Patent Publication No. 61-6349.

Because the obstacle detection device described in the above-mentioned publication makes a judgment of danger on an even frequency for all obstacles detected, in spite of the various levels of danger provided by these obstacles, a central processing unit (CPU) of the obstacle detection device must perform a large number of operations for the judgment of danger not only for obstacles producing high danger levels but also for obstacles producing low danger levels. Depending on driving circumstances, the capability of the CPU to practice repetitive operations may be exceeded. In this event, since the danger judgment for each of the many obstacles is retarded, it is potentially impossible to conduct fast response of the drive control system to obstacles of high priority. This leads to failure in escaping from high levels of danger. Although the utilization of a large capability CPU can overcome the problem, it forces the cost of manufacturing the obstacle detection device to go up and, hence, increases the cost of an automotive vehicle. Consequently, there has been a strong demand for an improved obstacle detection device or system capable of being furnished at low cost.

SUMMARY OF THE INVENTION

It is an object of the present invention to provide an obstacle detection system for an automotive vehicle in which a central processing unit (CPU) is subjected to a decreased total load so that it does not cause a delay in operation and in connection with and response to obstacles producing a high danger level, thereby providing a timely and quick judgment of danger for the obstacles.

The foregoing object of the present invention is accomplished by providing an obstacle detection system for an automotive vehicle which has an obstacle detection means, such as a laser radar, for detecting what is referred to in this specification as a "dynamic relativity" of the vehicle with respect to each obstacle ahead of the vehicle represented by at least a speed and a direction of the obstacle. The danger levels of detected obstacles are determined according to dynamic relativity and the judgment of danger is made at a frequency which is increasingly or decreasingly varied according to the danger level.

Specifically, the obstacle is determined to be at a high danger level when it is moving, when it is approaching the vehicle, when it is at a distance from the vehicle smaller than a predetermined distance, and/or when it is on a path ahead of the vehicle and on which the vehicle is traveling. On the other hand, the obstacle is determined to be at a low danger level when the obstacle stands still, when it is moving far ahead of the vehicle, when it is at a distance from the vehicle larger than the predetermined distance, or when it is out of the path ahead. That is, the judgment of danger is made at an increased frequency for an obstacle if the obstacle is at a high level of danger and at a decreased frequency if the obstacle is at a low level of danger.

The determination of danger level is excluded for an obstacle out of a path on which the vehicle is traveling. The level of danger may be determined according to possible travel path zones ahead of the vehicle. The possible travel path zones are classified into an overlapping path zone, where a presumptive straight path extending in a straight direction in which the vehicle is presently headed and a road lane extending ahead the vehicle overlap each other, a road path zone, which is part of the road lane extending apart from the presumptive straight path, and a straight path zone, which is part of the presumptive straight path extending apart from the road lane. The danger level is established to be the highest for the overlapping path zone and to be the lowest for the straight path zone.

With the obstacle detection system, the judgment of danger is made based not directly on the dynamic relativity between the vehicle and an obstacle ahead of the vehicle but on the danger level determined according to the dynamic relativity. The frequency of operation of danger judgment for an obstacle is made high when the obstacle is at a high danger level or low when it is at a low danger level. That is, the operation of danger judgment is not made at the same frequency for all obstacles but, instead, at different frequencies according to the danger levels of obstacles. Accordingly, the frequency at which the operation of danger judgment is made is lower for obstacles with low danger levels than for obstacles with high danger levels, so as to avoid futile operations of danger judgment for the obstacles at low danger levels. This provides a decrease in load on the CPU. On the other hand, due to the lowered frequency of danger judgment operation for low danger levels of obstacles, the CPU can afford to operate at a high frequency for obstacles at high danger levels so as to function without any delay in operation and response. This provides a timely and quick vehicle control so that the vehicle can avoid the obstacle.

BRIEF DESCRIPTION OF THE DRAWINGS

The above and other objects and features of the present invention will be clearly understood from the following description of preferred embodiments when considered in conjunction with the accompanying drawings, in which:

FIG. 1 is a block diagram of an obstacle detection system in accordance with a preferred embodiment of the present invention;

DETAILED DESCRIPTION OF THE PREFERRED EMBODIMENTS

Figure 2A:
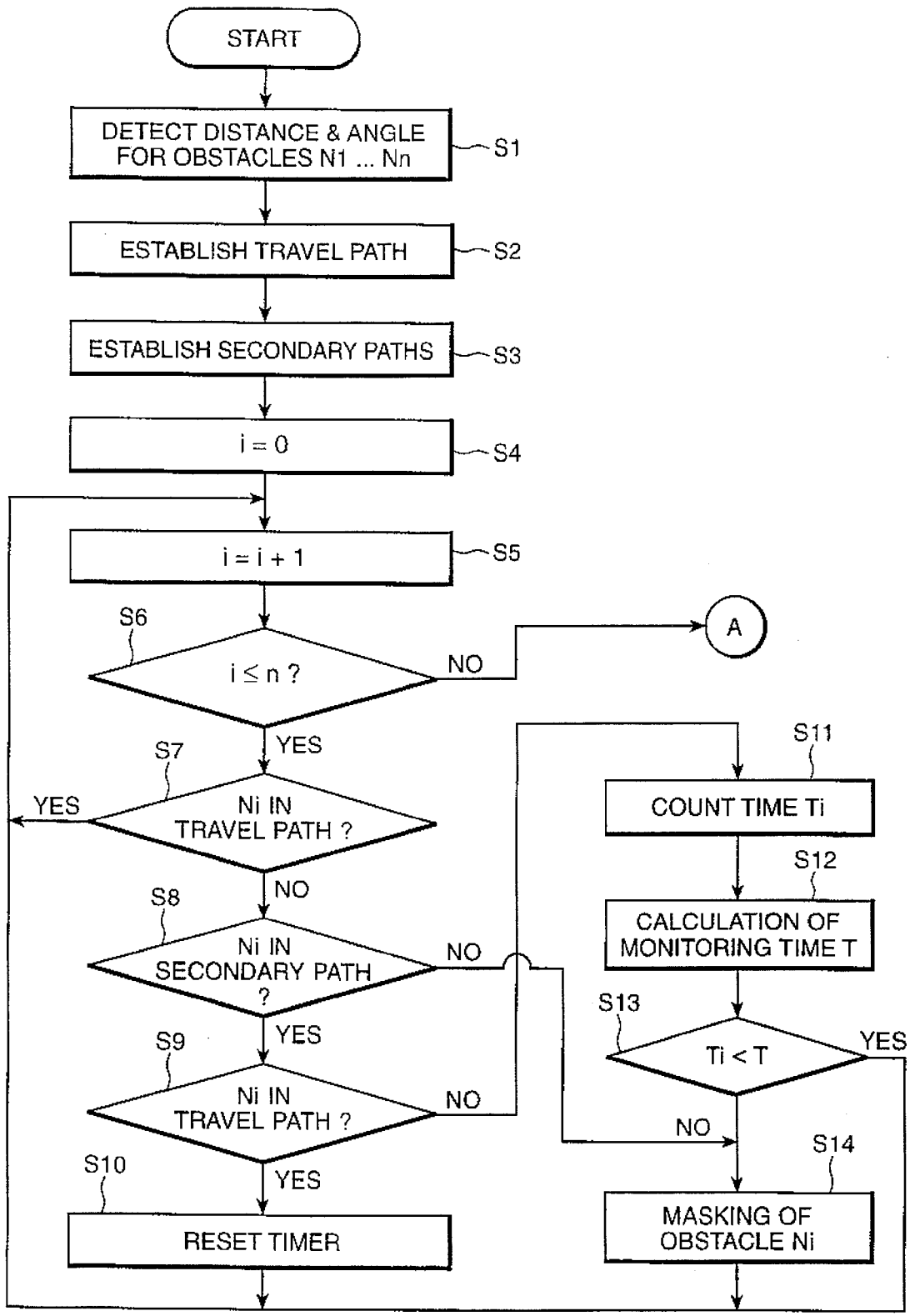
FIGS. 2A and 2B are flow charts illustrating an operation control routine for a microcomputer incorporated in the obstacle detection system.

Referring now to the drawings in detail and, in particular, to FIG. 1, showing an obstacle detection system for an automotive vehicle in block diagram in accordance with a preferred embodiment of the present invention, this obstacle detection system cooperates with an automatic brake system for applying braking force to each of the wheels of the vehicle. The obstacle detection system includes a laser radar type of distance detecting head or range finder unit 8 installed in the front section of the vehicle body (not shown). The laser range finder unit 8 is comprised of a laser radar unit 5, a signal processing unit 6 and an operational unit 7. The laser radar unit 5 emits a pulsed laser beam horizontally forward so as to scan a wide angle of field and receives a reflected beam from an obstacle ahead, such as another vehicle. As a lapse of time from the emission of a laser pulse to the reception of the laser pulse reflected by an obstacle ahead is proportional to the distance between the laser range finder unit 8 and the obstacle, the time required for each laser pulse to make a round-trip between them, detected by the laser radar head 5, is representative of the distance between them. The laser radar head 5 provides a signal for the distance between the vehicle (which is hereafter referred to as a subject vehicle) and an obstacle ahead (which is hereafter referred to as a preceding obstacle) captured within the scanned field and sends it to the signal processing unit 6 and the operational unit 7. The operational unit 7 operates on information representative of each obstacle detected by the laser radar head 5 at a frequency determined according to a danger level of the obstacle. Such a laser radar head 5 is well known per se to those skilled in the art and may be of any well known type.

The obstacle detection system further includes a steering angle sensor 9, a vehicle speed sensor 10 and a yaw rate sensor 11, which provide signals representative of an operated angle of the steering wheel, a speed of the vehicle and a yaw rate which the vehicle generates, respectively. These signals are sent to a path setting means 12 wherein the presently traveling path and secondary or reserve paths on both sides of the traveling path are set. All of these sensors 9–11 are well known per se to those skilled in the art and may be of any known type. In addition, the obstacle detection system is equipped with a path recognition unit 16 including a camera having a charge coupled device, namely a CCD camera 13, an image processing unit 14 and a path recognition unit 15. The CCD camera 13 has an angle of view coincident with the angle of scan. Image data representative of the scene provided by the CCD camera 13 is sent to the image processing unit 14 and then to the path recognition unit 15. This path recognition unit 15 recognizes a zone of travel by drawing white lane markings on both sides of the path on which the vehicle is traveling. Information provided in the laser range finder unit 8, path setting means 12 and path recognition unit 16 are sent to a judging means 17 wherein a judgment is made on the level of danger of the obstacle detected by the laser radar head 5, based on the information, and which provides information including distance and relative speed between the vehicle and the obstacle to a control unit 18 for an automatic brake system. This automatic brake system control unit 18 judges the risk level of a frontal end collision, causes a brake system to avoid a frontal end collision and provides a warning.

Figure 2B:
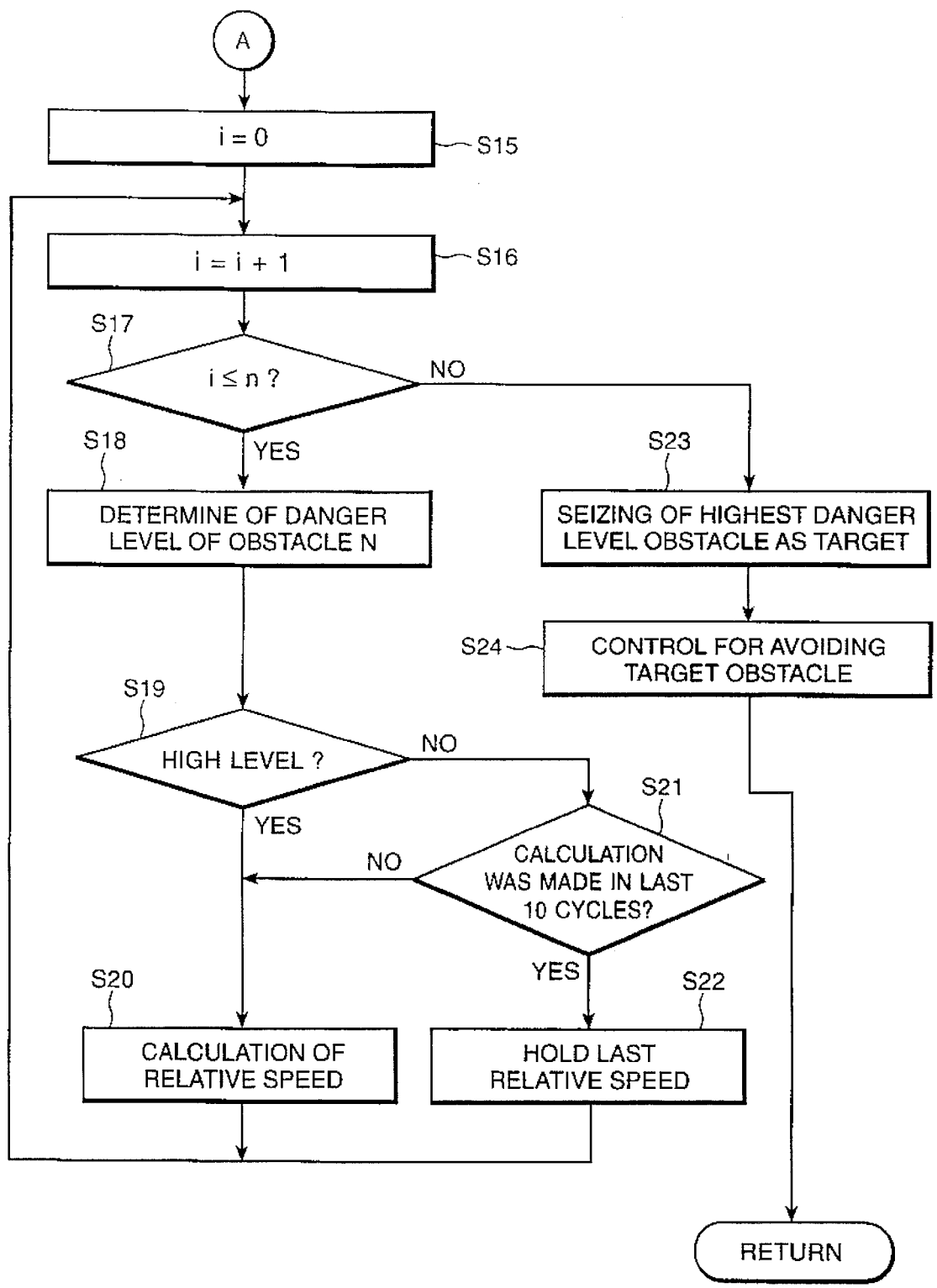

The operation of the obstacle detection system of the present invention is best understood by reviewing FIGS. 2A and 2B, which are flow charts illustrating an obstacle detection routine for a microcomputer of the obstacle detection system. Programming a computer is a skill well understood in the art. The following description is written to enable a programmer having ordinary skill in the art to prepare an appropriate program for the microcomputer. The particular details of any such program would, of course, depend upon the architecture of the particular computer selected.

Referring to FIGS. 2A and 2B, control starts and directly proceeds to step S1, where signals representative of distance and angle data on various preceding obstacles Ni (N1, ... , Nn), such as vehicles running ahead (which are hereafter referred to as preceding obstacles) with respect to the vehicle, are provided based on signals which the laser radar head 5 provides based, in turn, on reflected light from the preceding obstacles. Then, the path setting means 12 sets the path of travel, which is presumed, based on signals from the sensors 9–11 that the driver intends to travel at step S2 and secondary paths on opposite sides of the intended path of travel at step S3.

After having reset a variable i to zero (0) at step S4, the variable i is changed by an increment of one (1) at step S5. Subsequently, a decision is made at step S6 as to whether the variable i is equal to or smaller than the number n of preceding obstacles, in other words, whether processes from step S7 to step S14, which are provisionally necessary for the establishment of the level of danger, have been done on each of the preceding obstacles N1 to Nn. If the answer to the decision is "YES," a decision is made, without establishing the danger level on the preceding obstacle Ni at step S7, as to whether the obstacle Ni is on the intended travel path If the answer to this decision is "YES," then, after having changed the variable i by an increment of one (1) at step S5, the decision concerning the number of preceding obstacles is made at step S6. However, if the answer to the decision made at step S7 is "NO," this indicates that the preceding obstacle Ni is not on the intended travel path. Then, a decision is made at step S8 as to whether the preceding obstacle Ni is on any one of the secondary travel paths. If the answer to the decision made at step S8 is "NO," then after having masked the preceding obstacle Ni at step S14, the variable i is changed by an increment of one (1) at step S5 and the decision is subsequently made at step S6. On the other hand, if the answer to the decision made at S8 is "YES," then a decision is subsequently made at step S9 as to whether the obstacle Ni was on the intended travel path in the last cycle of the control routine. If the answer to this decision is "YES," then after having reset a timer Ti at step S10, the variable i is changed by an increment of one (1) at step S5 and the decision at step S6 is again made subsequently.

If the answer to the decision made at step S10 is "NO," then, the timer counts a duration time Ti at step S11 and, subsequently, a continuous monitoring time T is calculated at step S12. This continuous monitoring time T is calculated from the following formula:

$$T = V/M \times (1+d)$$

where M is the lateral distance that the preceding obstacle has moved from the intended travel path into the secondary travel path;

V is the speed of the vehicle; and d is a constant.

Thereafter, a decision is made at step S13 as to whether the duration time Ti is smaller than the continuous monitoring time T. If the duration time Ti is smaller than the continuous monitoring time T, then, control returns directly to step S5. However, if the answer to the decision made at step S13 is "YES," then, after having masked the preceding obstacle Ni at step S14, the control returns to step S5.

In the event that a preceding obstacle Ni, which has been detected to be on the intended travel path, changes its path into one of the secondary travel paths, the preceding obstacle Ni is still seized as one of possible target preceding obstacles until the timer counts out the continuous monitoring time T. The continuous monitoring time T is prolonged with (1) a decrease in the lateral distance that the preceding obstacle has moved from the intended travel path into the secondary travel path and/or (2) an increase in the speed of the vehicle.

If the answer to the decision made at step S6 is "NO," this indicates that preparatory operation has been done on all of the preceding obstacles Ni. Then, the level of danger is decided for each preceding obstacle Ni.

Specifically, as shown in FIG. 2B, after having reset the variable i to zero (0) again at step S15, the variable i is changed by an increment of one (1) at step S16. Subsequently, the same decision made at step S6 is made at step S17. If the answer to the decision made at step S17 is "YES," a danger level of the preceding obstacle Ni is determined at step S18.

Figure 3:
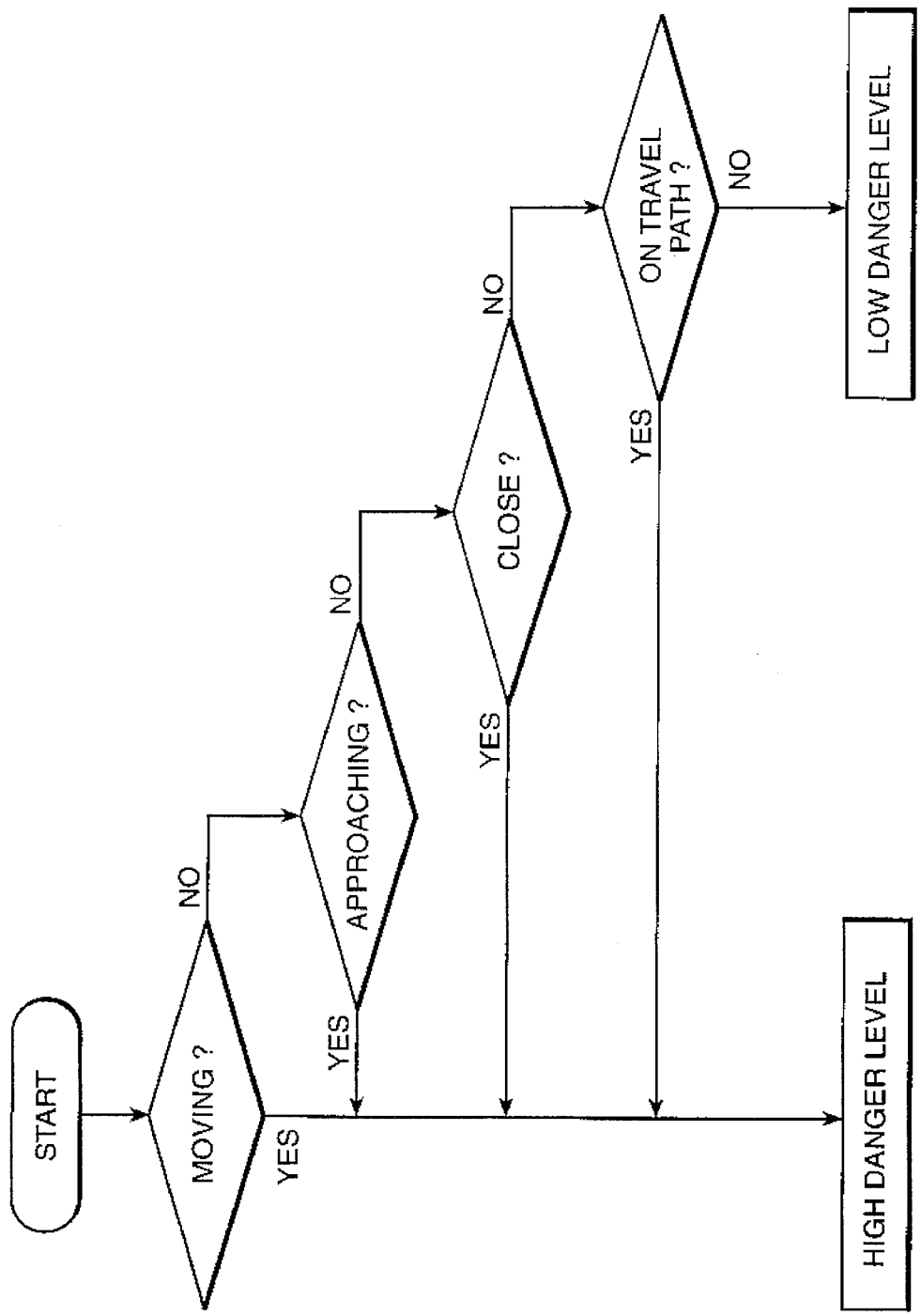
FIG. 3 is a flow chart illustrating a danger level determination subroutine.

Referring to FIG. 3, showing a flow chart illustrating a danger level determination subroutine, the danger level is basically determined to be high: (a) when the preceding obstacle Ni is moving; (b) when the preceding obstacle Ni is getting close to the vehicle; (c) when the distance of the vehicle from the preceding obstacle Ni is small; or (d) when the preceding obstacle Ni is on the intended travel path of the vehicle. On the other hand, the danger level is determined to be low when the preceding obstacle Ni stands still, is getting away from the vehicle, is at a large distance from the vehicle, or not on the intended travel path of the vehicle.

Figure 4:
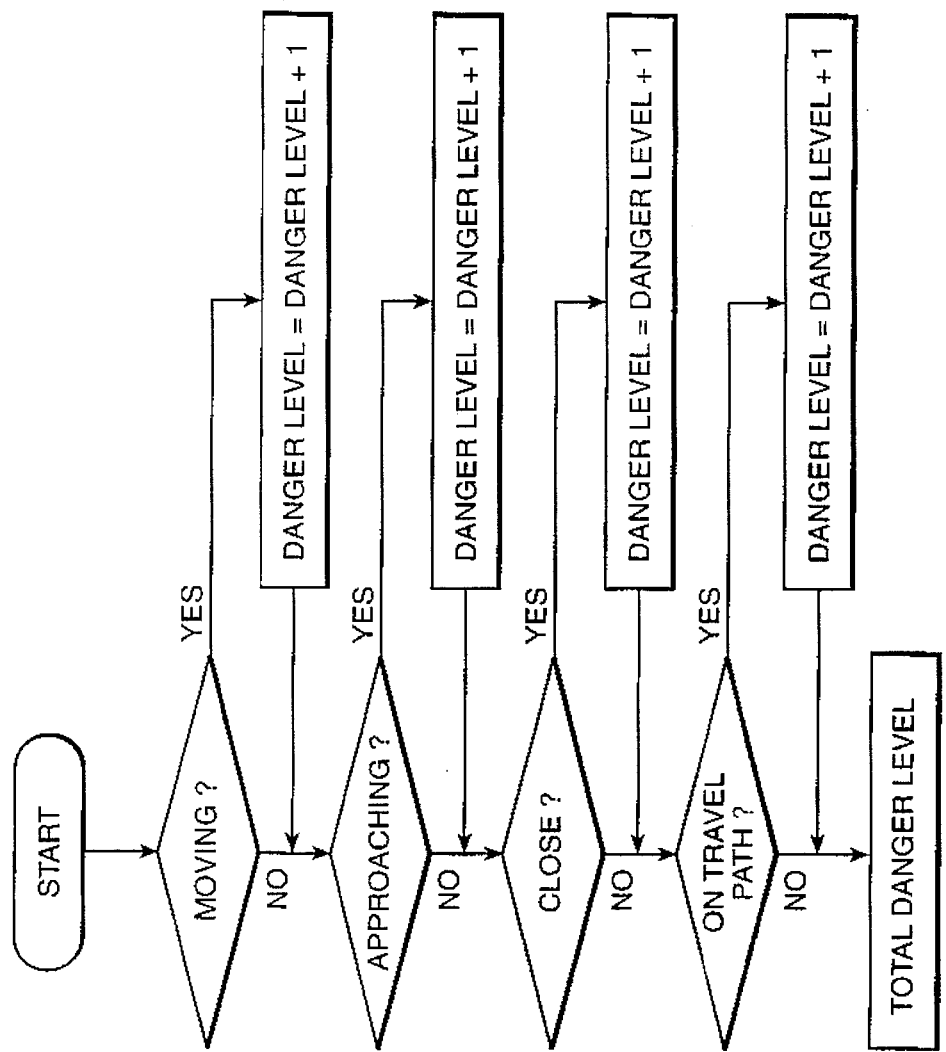
FIG. 4 is a flow chart illustrating another danger level determination subroutine.

Otherwise, the level of danger may be determined more specifically as shown in FIG. 4, illustrating a danger level determination subroutine. In this subroutine, a point is given and added whenever the answer to each decision is "YES." The level of danger for the preceding obstacle Ni is determined to be high or low according to the total points.

Referring back to FIG. 2B, after the determination of the level of danger for the preceding obstacle Ni at step S18, a decision is made at step S19 as to whether the danger level of the preceding obstacle Ni is high. If the answer to this decision is "YES," then, a relative speed of the vehicle, relative to the preceding obstacle Ni, is calculated at step S20. On the other hand, if the answer to the decision made at step S19 is "NO," that is, when the danger level of the preceding obstacle Ni is low, then, another decision is made at step S21 as to whether the calculation of relative speed was made in the last ten cycles. If the answer to this decision is "NO," then a relative speed of the vehicle relative to the preceding obstacle Ni is calculated at step S20. On the other hand, if the answer to the decision made in step S21 is "YES," then the relative speed calculated in the last ten cycles is held as a present relative speed at step S22. This calculation of relative speed is made for each preceding obstacle N1. When the relative speed calculation has been made for all of the preceding obstacles N1 to Nn, then, at step S23, one of the preceding obstacles N1 to Nn which has the highest level of danger is selected as a target preceding obstacle against which the vehicle is controlled. If there is a plurality of preceding obstacles having the highest level of danger, the closest preceding obstacle to the vehicle is selected as the target proceeding obstacle. Finally, the automatic brake system control unit 18 controls the automatic brake system to brake the vehicle so as to avoid the preceding obstacle with the highest danger level at step S24.

In place of judging the danger levels of preceding obstacles detected by the laser radar unit 5, the relative danger level may be judged by considering the possibility of travel with respect to the intended travel path and the secondary travel paths.

Figure 5:
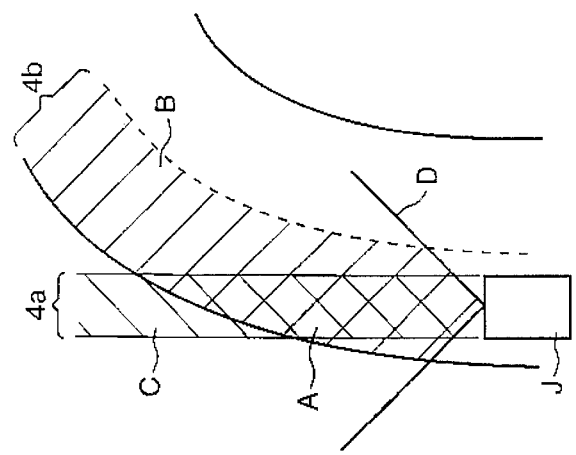
FIG. 5 is an explanatory illustration for explaining danger levels in connection with a curved road.

Referring to FIG. 5, while the vehicle J is traveling straight ahead toward a corner ahead of a road lane 4b on which the vehicle is traveling, there are three path zones ahead of the vehicle, namely an overlapping path zone A, where a presumptive straight path 4a extending in a direction in which the vehicle is presently headed and the curved road lane 4b overlap each other, a curved path zone B, which is part of the curved road lane 4b extending solely or apart from the presumptive straight path 4a, and a straight path zone C, which is part of the presumptive straight path extending solely or apart from the curved road lane 4b. The danger levels of the path zones A, B and C are determined, from high to low, in alphabetical order. Different frequencies of operation are assigned to the path zones A, B and C. Specifically, the operation is performed at, for instance, every cycle when a preceding obstacle is within the overlapping path zone A, which is determined to be the most dangerous zone, every two cycles when it is within the curved path zone B, which is determined to be a second most dangerous zone, and every five cycles when it is within the straight path zone C, which is determined to be the least dangerous zone.

As described above, in the obstacle detection system according to the present invention, the frequency of operation of the relative speed of the vehicle with respect to a preceding obstacle is made high or low according to danger levels of the preceding obstacle relative to the vehicle. The judgment of danger is effectively made for preceding obstacles with higher levels of danger. Because secondary travel paths on opposite sides of the intended travel path are established, even if there is no difference in danger levels among the obstacles due to a small number of obstacles detected on the intended travel path, upon movement of any one of the detected obstacles from the intended travel path to either one of the secondary travel paths, the preceding obstacle moving out of the intended travel path is continuously seized as one of possible target obstacles for the specific continuous monitoring time T, which depends on the speed of the preceding obstacle moving out of the intended travel path. This enables the vehicle to travel safely. In addition, because the specific continuous monitoring time T is changed according to the lateral distance that the preceding obstacle has moved from the intended travel path into the secondary travel path, it is set long for a preceding obstacle which has moved a short lateral distance which is considered to be more dangerous for the vehicle and, conversely, short for a preceding obstacle which has moved a long lateral distance which is considered to be less dangerous for the vehicle. The preceding obstacle is, therefore, detected continuously for a time necessary for the vehicle to drive safely.

In the embodiment described above, the frequency of operation is made high for a preceding obstacle which is judged to have the high danger level and low for a preceding obstacle which is judged to have the low danger level. Nevertheless, the operation frequency may be increasingly or decreasingly changed according to a plurality of danger levels. A large portion of preceding obstacles detected by the laser radar unit 5 are, in any case, judged to be low in danger level and, consequently, the judgments of danger are made at a considerably lower frequency or, otherwise, not at all, for these preceding obstacles. Thus, the CPU, bearing the function of danger judgment in the judging means 17, is subjected to a considerably decreased operation load. Accordingly, a delay in operation and response of the CPU in connection with a high danger level of obstacles is not caused, permitting a timely and quick control of the vehicle to avoid the obstacle.

It is to be understood that although the present invention has been described with regard to preferred embodiments thereof, various other embodiments and variants may occur to those skilled in the art. Such other embodiments and variants which are within the scope and spirit of the invention are intended to be covered by the following claims.

What is claimed is:

1. An obstacle detection system for an automotive vehicle for detecting obstacles ahead of the vehicle comprising:

obstacle detection means for detecting obstacles ahead of said vehicle and finding a dynamic relativity of said vehicle with respect to each of said obstacles;

danger judgement means for operating on information relating to a danger level between said vehicle and each of said obstacles based on said dynamic relativity so as to make a danger judgement;

danger level determining means for determining a danger level of each of said obstacles detected by said obstacle detection means; and frequency varying means for increasingly or decreasingly varying a frequency, at which said danger judgement means operates on said information relating to the danger level, according to danger levels of said obstacles;

wherein said danger level determining means additionally counts one point for one of said obstacles when said one of said obstacles is moving, when said one of said obstacles is approaching the vehicle and said one of said obstacles is at a distance from the vehicle smaller than a predetermined distance, and when said one of said obstacles is on a path ahead of the vehicle on which the vehicle is traveling, and determines the danger level of said one of said obstacles according to total points assigned to said one of said obstacles.

2. An obstacle detection system for an automotive vehicle for detecting obstacles ahead of the vehicle comprising;

obstacle detection means for detecting obstacles ahead of said vehicle and finding a dynamic relativity of said vehicle with respect to each of said obstacles;

danger judgement means for operating on information relating to a danger level between said vehicle and each of said obstacles based on said dynamic relativity so as to make a danger judgement;

danger level determining means for determining a danger level of each of said obstacles detected by said obstacle detection means; and frequency varying means for increasingly or decreasingly varying a frequency, at which said danger judgement means operates on said information relating to the danger level, according to danger levels of said obstacles;

wherein said danger level determining means determines danger levels of crashing for one of said obstacles according to possible travel path zones ahead of the vehicle in which said one of said obstacles is and said possible travel path zones are classified into an overlapping path zone in which a presumptive straight path, extending in a straight direction and on which the vehicle is presently headed, and a road lane extending ahead of the vehicle overlap each other, a road path zone which is part of said road lane extending apart from said presumptive straight path, and a straight path zone which is part of said presumptive straight path extending apart from said road lane, said danger level determining means determining said overlapping path zone, said road path zone and said straight path zone to have danger levels which vary from highest to lowest, in this order.

3. An obstacle detection system for an automotive vehicle for detecting obstacles ahead of the vehicle comprising:

obstacle detection means for detecting conditions of obstacles ahead of said vehicle;

danger judgement means for comparing a condition of each obstacle with predetermined obstacle conditions to which predetermined levels of danger are assigned;

danger level determining means for determining one of said predetermined levels of danger according to conformity of said condition of each obstacle to any one of said predetermined obstacle conditions, said danger level determining means further additionally counting one point whenever conformity of said condition of each obstacle to one of said predetermined obstacle conditions occurs and determining a danger level according to total points; and frequency varying means for increasingly or decreasingly varying a frequency at which said danger judgement means compares said condition of each obstacle with said predetermined obstacle conditions according to danger levels of said obstacles.

4. An obstacle detection system as defined in claim 3, wherein each predetermined obstacle condition is defined by at least a relative travelling speed and a travelling direction of an obstacle with respect to said vehicle.

5. An obstacle detection system as defined in claim 3, wherein a high danger level is assigned to a condition in which an obstacle is moving and a low danger level is assigned to a condition in which said obstacle stands still.

6. An obstacle detection system as defined in claim 3, wherein a high danger level is assigned to a condition in which an obstacle is approaching relative to said vehicle and a low danger level is assigned to a condition in which said obstacle is moving away from said vehicle.

7. An obstacle detection system as defined in claim 3, wherein a high danger level is assigned to a condition in which a distance between an obstacle and said vehicle is shorter than a predetermined distance and a low danger level is assigned to a condition in which said distance is longer than said predetermined distance.

8. An obstacle detection system as defined in claim 3, wherein a high danger level is assigned to a condition in which an obstacle is on a path, ahead of said vehicle, on which said vehicle is traveling and a low danger level is assigned to a condition in which said obstacle is out of said path.

9. An obstacle detection system as defined in claim 3, wherein said danger judgement means excludes comparing the condition when an obstacle is out of a path, ahead of said vehicle, on which said vehicle is traveling.

10. An obstacle detection system as defined in claim 3, wherein said danger level determining means determines danger levels of an obstacle according to possible travel path zones, ahead of said vehicle, in which said obstacle is located.

11. An obstacle detection system as defined in claim 3, wherein said danger level determining means further additionally counts one point when an obstacle is moving, when said obstacle is at a distance from said vehicle shorter than a predetermined distance and approaching said vehicle, and when said obstacle is on a path, ahead of said vehicle, on which said vehicle is traveling and determines the danger level of said obstacle according to total points assigned to said obstacle.

12. An obstacle detection system for an automotive vehicle for detecting obstacles ahead of the vehicle comprising:

obstacle detection means for detecting one of predetermined path zones in which an obstacle is located, said predetermined path zones including a path zone in which said vehicle is located;

danger level determining means for determining one of predetermined levels of danger according to said path zone in which said obstacle is located;

danger judgement means for detecting conditions of obstacles ahead of said vehicle and comparing a condition of each obstacle with predetermined obstacle conditions to which predetermined levels of danger are assigned, wherein said danger level determining means determines one of said predetermined levels of danger according to conformity of said condition of each said obstacle to any one of said predetermined obstacle conditions; and frequency varying means for increasingly or decreasingly varying a frequency, at which said obstacle detection means detects one of said predetermined path zones, according to danger levels of said obstacles.

13. An obstacle detection system as defined in claim 12, wherein said predetermined path zones are classified into (1) an overlapping path zone in which a presumptive straight path, extending in a straight direction and on which said vehicle is presently headed, and a road lane, extending ahead of said vehicle, overlap each other, (2) a road path zone which is part of said road lane extending apart from said presumptive straight path, and (3) a straight path zone which is part of said presumptive straight path extending apart from said road lane, said danger level determining means determining said overlapping path zone, said road path zone and said straight path zone to have danger levels which vary from highest to lowest, respectively.

14. An obstacle detection system as defined in claim 12, wherein each predetermined obstacle condition is defined by at least a relative travelling speed and a travelling direction of said obstacle with respect to said vehicle.

15. An obstacle detection system as defined in claim 12, wherein a high danger level is assigned to a condition in which said obstacle is moving and a low danger level is assigned to a condition in which said obstacle stand still.

16. An obstacle detection system as defined in claim 12, wherein a high danger level is assigned to a condition in which said obstacle is approaching relative to said vehicle and a low danger level is assigned to a condition in which said obstacle is moving away from said vehicle.

17. An obstacle detection system as defined in claim 12, wherein a high danger level is assigned to a condition in which a distance between said obstacle and said vehicle is shorter than a predetermined distance and a low danger level is assigned to a condition in which said distance is longer than said predetermined distance.

18. An obstacle detection system as defined in claim 12, wherein a high danger level is assigned to a condition in which said obstacle is on a path ahead of said vehicle on which said vehicle is traveling and a low danger level is assigned to a condition in which said obstacle is out of said path.

\* \* \* \* \*